(12) United States Patent
Ikeda

(10) Patent No.: US 11,457,137 B2
(45) Date of Patent: Sep. 27, 2022

(54) ELECTRONIC APPARATUS AND CONTROL METHOD FOR ELECTRONIC APPARATUS

(71) Applicant: CANON KABUSHIKI KAISHA, Tokyo (JP)

(72) Inventor: Takahiro Ikeda, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 100 days.

(21) Appl. No.: 17/063,990

(22) Filed: Oct. 6, 2020

(65) Prior Publication Data

US 2021/0105399 A1 Apr. 8, 2021

(30) Foreign Application Priority Data

Oct. 7, 2019 (JP) .............................. JP2019-184647

(51) Int. Cl.
*H04N 5/225* (2006.01)
*H04N 5/232* (2006.01)

(52) U.S. Cl.
CPC ..... *H04N 5/23216* (2013.01); *H04N 5/23218* (2018.08); *H04N 5/232933* (2018.08); *H04N 5/232939* (2018.08)

(58) Field of Classification Search
CPC ........... H04N 5/23216; H04N 5/23218; H04N 5/232933; H04N 5/232939; H04N 5/23293; H04N 5/23219
See application file for complete search history.

(56) References Cited

U.S. PATENT DOCUMENTS

| | | | | |
|---|---|---|---|---|
| 2004/0051803 A1* | 3/2004 | Venturino | ........ | H04N 5/232933 348/333.12 |
| 2004/0141084 A1* | 7/2004 | Kurakata | ........... | H04N 1/00461 348/333.01 |
| 2013/0111400 A1* | 5/2013 | Miwa | ................. | H04N 5/23212 715/835 |
| 2016/0337580 A1* | 11/2016 | Kwon | ................. | G06F 3/04817 |
| 2018/0063431 A1* | 3/2018 | Cho | .................... | H04N 5/23216 |

FOREIGN PATENT DOCUMENTS

JP 2010-177813 A 8/2010

* cited by examiner

*Primary Examiner* — Kelly L Jerabek
(74) *Attorney, Agent, or Firm* — Cowan, Liebowitz & Latman, P.C.

(57) ABSTRACT

An electronic apparatus of the present invention includes: an acquisition unit configured to acquire an image captured on any one of a plurality of conditions in a predetermined period; a display control unit configured to implement control so that a plurality of images acquired by the acquisition unit are classified into groups correspondingly to the plurality of conditions and displayed; and a selection unit configured to implement control so that an operation target image is selected in accordance with user operation from the plurality of images that are classified and displayed by the display control unit.

13 Claims, 7 Drawing Sheets

ELECTRONIC APPARATUS AND CONTROL METHOD FOR ELECTRONIC APPARATUS

BACKGROUND OF THE INVENTION

Field of the Invention

The present invention relates to an electronic apparatus, a control method for electronic apparatus, a program, and a recording medium, and more particularly to an image captured by automatic image capturing.

Description of the Related Art

In recent years, an automatic image capturing technique for capturing images when predetermined conditions are met, in accordance with the subject and image capturing situation, is known. Concerning saving and deleting automatically captured images, Japanese Patent Laid-Open No. 2010-177813 proposes that an image of a subject individual having a predetermined facial expression is automatically captured, and is displayed in a list on a display screen.

However in the case of automatically capturing images matching with one of a plurality of conditions, and displaying the captured images in a list in a time series, the images captured under the same condition may be displayed at distant positions. If this occurs, the user easily misses similar images, and the comparison of these images becomes difficult. Since it is difficult to determine whether each automatically captured image is necessary or not, unnecessary images may remain.

Further, in the case of deleting all the images that were automatically captured under a specific condition, if these images are displayed at distant places, or if the condition under which the images were automatically captured is not clear, it may be time-consuming for the user to delete images, and the user may not be able to select all the images that should be deleted.

In this way, if the automatically captured images cannot be easily compared, the user will have difficulty determining whether each image is necessary, and unnecessary images may remain without being deleted.

SUMMARY OF THE INVENTION

The present invention provides an electronic apparatus which can make it easier for the user to select operation target images, even if these images are automatically captured on any one of a plurality of conditions.

An electronic apparatus of the present invention includes: an acquisition unit configured to acquire an image captured on any one of a plurality of conditions in a predetermined period; a display control unit configured to implement control so that a plurality of images acquired by the acquisition unit are classified into groups correspondingly to the plurality of conditions and displayed; and a selection unit configured to implement control so that an operation target image is selected in accordance with user operation from the plurality of images that are classified and displayed by the display control unit.

Further features of the present invention will become apparent from the following description of exemplary embodiments with reference to the attached drawings.

DESCRIPTION OF THE EMBODIMENTS

Embodiment

External View of Digital Camera

Figure 1:
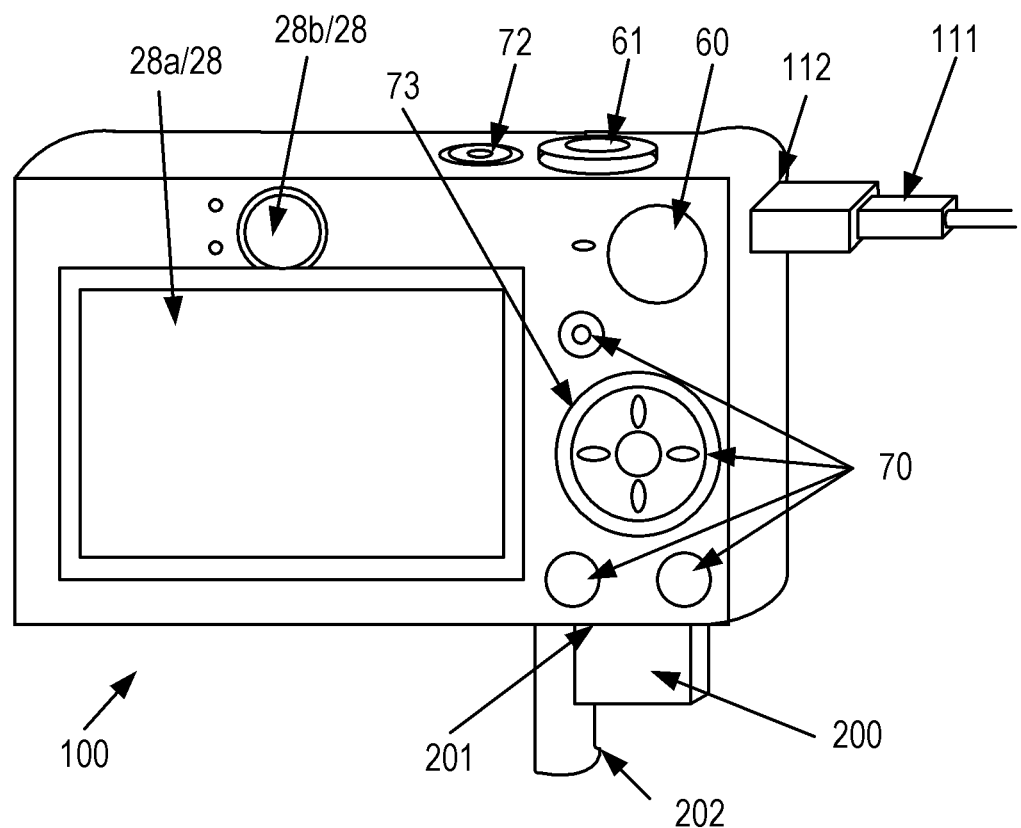
FIG. 1 is an external view of a digital camera which is an example of the electronic apparatus.

Embodiments of the present invention will be described with reference to the drawings. In this embodiment, a case where an electronic apparatus is a digital camera will be described, but the present invention is not limited to this. FIG. 1 is an external view of a digital camera 100, which is an example of an electronic apparatus to which the present invention will be applied.

A display unit 28 displays a captured still images and various information. The display unit 28 includes a rear face display panel 28a and an electronic view finder 28b, which is a display unit of a finder.

A shutter button 61 is an operation unit for the user to instruct image capturing. A mode selection switch 60 is an operation unit to switch various modes. A connector 112 connects a connection cable 111, which is used to connect such an external apparatus as a personal computer and a printer, with the digital camera 100.

An operation unit 70 is an operation member to receive various operations performed by the user, such as various switches, buttons and a touch panel. A controller wheel 73 is a rotatable operation member included in the operation unit 70. A power switch 72 is a push button to switch power ON/OFF.

A recording medium 200 is a recording medium, such as a memory card and a hard disk. A recording medium slot 201 is a slot for housing the recording medium 200. The recording medium 200 housed in the recording medium slot 201 can communicate with the digital camera 100, whereby captured still images or the like can be recorded, and still images or the like recorded in the recording medium 200 can be reproduced. A cover 203 is a cover of the recording medium slot 201. FIG. 1 indicates a state where the cover 202 is opened and the recording medium 200 is partially taken out from the slot 201 and exposed.

Block Diagram of Digital Camera

Figure 2:
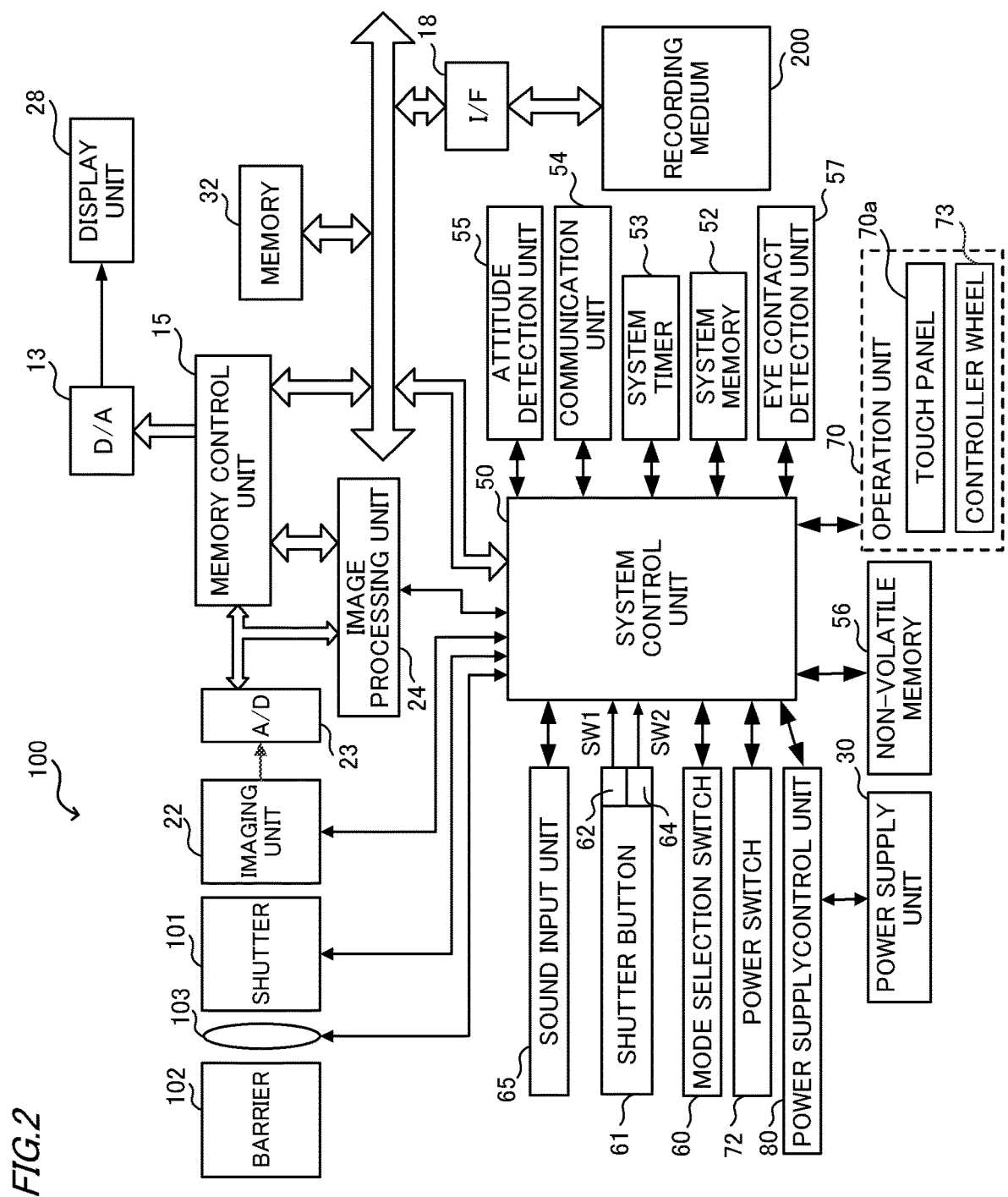
FIG. 2 is a block diagram depicting a digital camera.

FIG. 2 is a block diagram depicting a configuration example of the digital camera 100 according to this embodiment. An image capturing lens 103 is constituted of a plurality of lenses, including a zoom lens and a focus lens. In FIG. 2, the image capturing lens 103 is illustrated as one lens for simplification.

A shutter 101 is a member having an aperture function. An imaging unit 22 is an image pickup element constituted of a CCD, a CMOS element or the like, to convert an optical image into electric signals. An A/D convertor 23 converts analog signals into digital signals. The A/D convertor 23 is used for converting analog signals, outputted from the imaging unit 22, into digital signals. A barrier 102 covers the imaging system including the image capturing lens 103, so as to prevent contamination of and damage to the imaging system, constituted of the image capturing lens 103, the shutter 101 and the imaging unit 22.

An image processing unit 24 performs predetermined processing (e.g. pixel interpolation, resizing, such as demagnification, color conversion) on the data from the A/D convertor 23 or the data from a memory control unit 15. The image processing unit 24 also performs a predetermined arithmetic processing using a captured still image data, and a system control unit 50 performs exposure control and distance measurement control based on the acquired arithmetic result. Thereby through-the-lens (TTL) type auto focus (AF) processing, auto exposure (AE) processing, pre-flash emission (EF) processing and the like are performed. Furthermore, the image processing unit 24 performs a predetermined arithmetic processing using the captured still image data, and performs TTL type auto white balance (AWB) processing based on the acquired arithmetic result.

The output data from the A/D convertor 23 is written to the memory 32 via the image processing unit 24 and the memory control unit 15. In some cases, the output data from the A/D convertor 23 is written to the memory 32 via the memory control unit 15 without using the image processing unit 24. The memory 32 stores still image data, which was acquired by the imaging unit 22 and converted into digital data by the A/D convertor 23, and stores still image data to be displayed on the display unit 28. The memory 32 has a storage capacity that is sufficient to store a predetermined number of still images and a predetermined duration of moving images and sounds.

The memory 32 is also a memory for displaying still images (video memory). A D/A convertor 13 converts the data for displaying still images stored in the memory 32 into analog signals, and supplies the analog signals to the display unit 28. Thus, the still image data for display written in the memory 32 is displayed on the display unit 28 via the D/A convertor 13. The display unit 28 performs display in accordance with the analog signal from the D/A convertor 13 on such a display as a liquid crystal display (LCD) and an organic EL.

If the digital signals, which were A/D converted by the A/D convertor 23 and stored in the memory 32, are converted into analog signals by the D/A convertor 13 and sequentially transferred and displayed on the display unit 28b, the display unit 28b can function as an electronic view finder (EVF). Thus, the display unit 28b can perform the through still image display (live view display) as an electronic view finder.

A non-volatile memory 56 is a memory which is electrically erasable and recordable, such as EEPROM. In the non-volatile memory 56, constants and programs for operating the system control unit 50, for example, are recorded. "Programs" here refers to the programs for executing various flow charts, which will be described later in this embodiment.

The system control unit 50 is a control unit which includes at least one processor or circuit, and controls the digital camera 100 in general. The system control unit 50 implements each processing of this embodiment (described later) by executing the programs recorded in the abovementioned non-volatile memory 56. A system memory 52 is a RAM, for example. The system control unit 50 develops, in the system memory 52, the constants and variables for operating the system control unit 50, and the programs read from the non-volatile memory 56. The system control unit 50 also controls display by controlling the memory 32, the image processing unit 24 and the memory control unit 15.

A system timer 53 is a clock unit that measures the time used for various controls, and the time of the internal clock.

A mode selection switch 60, a shutter button 61 and the operation unit 70 are operation members to input various operation instructions to the system control unit 50. The mode selection switch 60 switches the operation mode of the system control unit 50 to the still image recording mode, the moving image capturing mode or the reproduction mode, for example. The modes included in the still image recording mode are: auto image capturing mode, auto scene determination mode, manual mode, various scene modes, i.e., image capturing setting for each image capturing scene, program AE mode, and custom mode. Using the mode selection switch 60, the user can directly select any of these modes. The user may also select menu buttons using the mode selection switch 60, then select any of these modes included in the menu buttons using another operation member. In the same manner, a plurality of modes may be included in the moving image capturing mode.

The shutter button 61 includes a first shutter switch 62 and a second shutter switch 64. The first shutter switch 62 is turned ON in mid-operation of the shutter button 61, that is, in the half-depressed state (image capturing preparation instruction), and generates a first shutter switch signal SW1. By the first shutter switch signal SW1, the system control unit 50 starts an operation, such as auto focus (AF) processing, auto exposure (AE) processing, auto white balance (AWB) processing and pre-flash emission (EF) processing.

The second shutter switch 64 is turned ON when the operation of the shutter button 61 completes, that is, in the fully-depressed state (image capturing instruction), and generates a second shutter switch signal SW2. By the second shutter switch signal SW2, the system control unit 50 starts a series of operations of the image capturing processing, from reading signals from the imaging unit 22 to writing the still image data to the recording medium 200.

To each operation member of the operation unit 70, an appropriate function is assigned for each scene, by selecting various function icons displayed on the display unit 28a, for example, whereby each operation member functions as various buttons. The function buttons are, for example, an end button, return button, still image switching button, jump button, preview button and attribute change button. If the menu button is pressed, for example, a menu screen, which allows various settings, is displayed on the display unit 28a. The user can intuitively perform various settings using the menu screen displayed on the display unit 28a, the four-direction (up, down, left, right) key and a SET button.

The controller wheel 73 is a rotatable operation member included in the operation unit 70, and is used with the four-direction key for instructing a selected item. When the controller wheel 73 is rotated, an electric pulse signal is generated in accordance with the operation amount, and the system control unit 50 controls each unit of the digital camera 100 based on this pulse signal. By this pulse signal, the system control unit 50 can determine the angle of rotation of the controller wheel 73 and a number of times of rotation thereof. The controller wheel 73 may be any operation member as long as the rotation operation can be detected. For example, the controller wheel 73 may be a dial operation member that generates a pulse signal by rotation of the controller wheel 73 itself is rotated in accordance with the rotation operation performed by the user. Further, the controller wheel 73 may be an operation member constituted of a touch sensor (touch wheel), which detects the rotation operation of the fingers of the user on the controller wheel 73, for example, although the controller wheel 73 itself does not rotate.

A power supply control unit 80 includes a battery detection circuit, a DC-DC convertor and switch circuits to switch blocks to be energized, and detects whether a battery is installed, the type of battery, and the residual amount of battery power. The power supply control unit 80 also controls the DC-DC convertor based on the detection result and the instruction from the system control unit 50, and supplies the required voltage to each unit, including the recording medium 200, for a required period of time. A power supply unit 30 is constituted of a primary battery (e.g. alkali battery, lithium battery), a secondary battery (e.g. NiCd battery, NiMH battery, Li battery), an AC adapter and the like.

A recording medium I/F 18 is an interface with the recording medium 200 (e.g. memory card, hard disk). The recording medium 200 is a recording medium to record captured still images, such as a memory card, and is constituted of a semiconductor memory, an optical disk, a magnetic disk or the like.

A communication unit 54 transmits/receives video signals and sound signals wirelessly or via cable. The communication unit 54 can also be connected to a wireless local area network (LAN) and Internet. The communication unit 54 can transmit a still image (including a through still image) captured by the imaging unit 22 and a still image recorded in the recording medium 200 to an external apparatus, and can receive still image data and various other information from an external apparatus.

An attitude detection unit 55 detects an attitude of the digital camera 100 with respect to the gravity direction. Based on the attitude detected by the attitude detection unit 55, it can be determined whether a still image captured by the imaging unit 22 is a still image captured by the digital camera 100 which is held horizontally, or a still image captured by the digital camera 100 which is held vertically. The system control unit 50 can attach the orientation information, in accordance with the attitude detected by the attitude detection unit 55, to a still image file of a still image captured by the imaging unit 22, or can record the still image in the rotated state. For the attitude detection unit 55, an acceleration sensor, a gyro sensor or the like can be used.

An eye contact detection unit 57 detects the approach of an eye (object). The system control unit switches the display/non-display of the rear face display panel 28*a* and the electronic view finder 28*b* in accordance with the state detected by the eye contact detection unit 57.

A sound input unit 65 inputs sound from the outside and sends the sound data inputted to the system control unit 50. A/D conversion of sound from analog data into digital data is performed by the system control unit 50, but the sound input unit 65 may send to the system control unit 50 the digital data A/D converted from the analog data. The sound input unit 65 is included in the digital camera 100, but may be an external microphone connected via an audio able or the like.

As a part of the operation unit 70, the digital camera 100 includes a touch panel 70*a* that can detect contact with the display unit 28*a*. The touch panel 70*a* and the display unit 28*a* can be integrated. For example, the touch panel 70*a* is configured such that the transmittance of the light does not interfere with the display on the display unit 28*a*, so as to be integrated inside the display surface of the display unit 28*a* (in-cell type). Then the input coordinates on the touch panel 70*a* and the display coordinates on the display surface of the display unit 28*a* are corresponded with each other. Thereby a graphical user interface (GUI), allowing the user to directly operate the screen displayed on the display unit 28*a*, can be provided.

The system control unit 50 can detect the following operations on the touch panel 70*a* or the states thereof.

A finger or pen which is not touching the touch panel 70*a* touches the touch panel 70*a*, that is, touch is started (hereafter Touch-Down).

A finger or pen is touching the touch panel 70*a* (hereafter Touch-On).

A finger or pen is moving in the state of touching the touch panel 70*a* (hereafter Touch-Move).

A finger or pen, which is touching the touch panel 70*a*, is released from the touch panel 70*a*, that is, touch is ended (hereafter Touch-Up).

Nothing is touching the touch panel 70*a* (hereafter Touch-Off).

When Touch-Down is detected, Touch-On is also detected at the same time. Unless Touch-Up is detected after Touch-Down, Touch-On is normally detected continuously. When Touch-Move is detected as well, Touch-On is detected at the same time. Even if Touch-On is detected, Touch-Move is not detected unless the touch position is moving. Touch-Off is detected when Touch-Up of all fingers or pen is detected.

These operations, states and coordinates of the positions of the fingers or pen touching the touch panel 70*a* are notified to the system control unit 50 via the internal bus. Then based on the notified information, the system control unit 50 determines the kind of operation (touch operation) that was performed on the touch panel 70*a*. For Touch-Move, the system control unit 50 can also determine the moving directions of the fingers or pen on the touch panel 70*a*, based on the change of the positional coordinates, for the vertical components and the horizontal components on the touch panel 70*a* respectively. If Touch-Move is detected for at least a predetermined distance, the system control unit 50 determines that the slide operation (dragging) was performed. An operation of quickly moving a finger on the touch panel 70*a* for a certain distance in the touched state and releasing the finger is called "flick". In other words, flick is an operation of moving and releasing the finger rapidly on the touch panel 70*a*. If Touch-Move is detected for at least a predetermined distance at a predetermined speed or faster, and Touch-Up is detected thereafter, the system control unit 50 determines that flick was performed (determined that flick was performed after dragging).

Further, a touch operation of touching a plurality of points (e.g. two points) simultaneously and moving these positions closer together is called "Pinch-In", and a touch operation of moving these two positions further part is called "Pinch-Out". Pinch-In and Pinch-Out are collectively called a pinch operation (or simply "pinch"). For the touch panel 70*a*, various types of touch panels may be used, such as a resistive film type, a capacitive type, a surface acoustic wave type, an infrared type, an electro-magnetic induction type, a still image recognition type and an optical sensor type. There is a type of detecting touch when the touch panel is actually contacted, and a type of detecting touch when a finger or pen approaches the touch panel, however either type may be used.

The digital camera 100 can be used by selecting at least a reproduction mode for reproducing still images or an image capturing mode for capturing images. The image capturing mode includes an auto mode, manual mode and a plurality of scene-based image capturing modes. The auto mode is a mode where various parameters of the digital camera 100 are automatically determined by the program embedded in the digital camera 100 based on the measured exposure value. The manual mode is a mode where the user can freely change various parameters of the camera. The scene-based image capturing mode is an image capturing mode that is implemented by combining the shutter speed, aperture value, stroboscopic light emission state, sensitivity setting, white balance (WB) setting and the like appropriately for each image capturing scene.

The digital camera 100 has the following scene-based image capturing modes (1) to (4), for example. However, the scene-based image capturing modes are not limited to these four.

(1) Portrait image capturing mode: mode especially used for capturing a portrait image in which the subject individual stands out by defocusing the background.
(2) Flower image capturing mode: mode in which macro mode is set, and chroma is set slightly higher than usual.
(3) Sport image capturing mode: mode especially used for capturing an image of a subject that is moving quickly.
(4) Automatic image capturing mode: mode in which the subject or sound is recognized whereby the image is captured automatically.

The user can capture images by setting the digital camera 100 to a desired image capturing mode selected from the image capturing mode selection menu.

Automatic Image Capturing Processing

Figure 3:
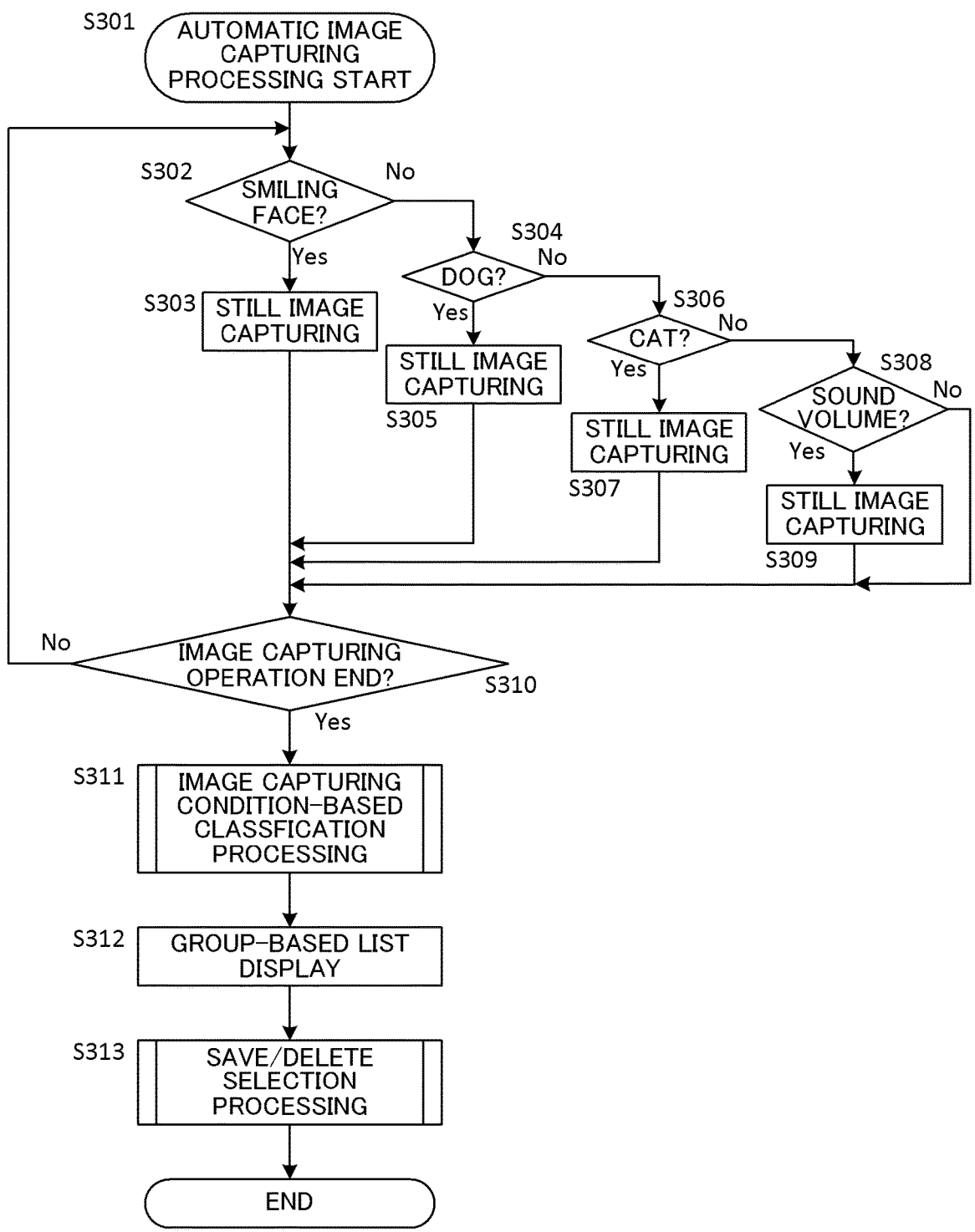
FIG. 3 is a flow chart exemplifying a processing from automatic image capturing to save/delete of images.

FIG. 3 is a flow chart exemplifying the processing of the digital camera 100 according to this embodiment, from automatic image capturing to saving or deleting the images. The processing in FIG. 3 is a processing of classifying a plurality of still images, which were automatically captured in the automatic image capturing mode and recorded in the memory 32, into groups corresponding to conditions of the automatic image capturing, and having the user selecting a still image to be saved or a still image to be deleted as an operation target. In this example, a case of automatically capturing still images will be described as an example of a target image, but the images that are automatically captured and that are grouped and selected (described later) are not limited to still images. This embodiment is also applicable to a case of automatically capturing moving images, or a case of automatically capturing a mixture of still images and moving images.

A still image to be deleted ("deleting target still image") is deleted from the memory 32 by the user instructing execution of delete. In this case, a still image which is not set for delete is saved in the memory 32 or the recording medium 200, as a still image to be saved ("saving target still image"), in the same manner as the images that the user captured manually. Each processing in this flow chart is implemented by the system control unit 50 developing the program, which is stored in the non-volatile memory 56, in the system memory 52 and executing the program, when the power switch 72 is turned ON, for example.

In the automatic image capturing processing in FIG. 3, an automatic image capturing mode is selected as the image capturing mode. The automatic image capturing mode is a mode in which the digital camera 100 automatically executes the image capturing operation in the case where any of a plurality of predetermined conditions is met. A predetermined image capturing period (predetermined period) starts when the automatic image capturing mode is selected, for example. The conditions to execute the automatic image capturing may be set by the user, or may be set by the user selecting one of the automatic image capturing conditions that are defined in advance.

Here it is assumed that the automatic image capturing is performed when one of the four conditions: automatic image capturing of a smiling face, automatic image capturing of a dog, automatic image capturing of a cat, and automatic image capturing of a predetermined sound volume, is met. In the automatic image capturing, the operation of image capturing processing is automatically executed when the digital camera 100 analyzes the through still image or sound data from the sound input unit 65, and the image capturing target (subject) matches with one of the plurality of conditions.

In the case of the automatic image capturing of a smiling face, when a smiling face of an individual is recognized, an image of the individual with the smiling face is automatically captured as an image capturing target. In the case of the automatic image capturing of a dog or a cat, when the dog or cat, i.e., subject, facing the digital camera 100 is recognized, the image of the dog or cat is automatically captured as an image capturing target. In the case of the automatic image capturing at a predetermined sound volume, when it is recognized that the volume of the sound detected by the sound input unit 65 is a threshold or more, an image in the direction where the sound is detected is automatically captured as an image capturing target.

In S301, the system control unit 50 starts the automatic image capturing processing. The system control unit 50 starts the automatic image capturing processing when the start instruction is received from the operation unit 70. The system control unit 50 sets the mode of the digital camera 100 to the automatic image capturing mode, and successively determines whether the image of the image capturing target is automatically captured.

In S302, the system control unit 50 determines whether an individual with a smiling face is recognized. The system control unit 50 advances the processing to S303 if an individual with a smiling face is recognized, or to S304 if no, an individual with a smiling face is recognized.

In step S303, the system control unit 50 controls so that the imaging unit 22 captures a still image of the individual with a smiling face recognized in S302. The system control unit 50 records the captured still image in the memory 32 with attaching the information indicating that the condition is automatic image capturing of an individual with a smiling face.

In S304, the system control unit 50 determines whether a dog facing the digital camera 100 is recognized. The system control unit 50 advances the processing to S305 if a dog facing the digital camera 100 is recognized. The system control unit 50 advances processing to S306 if no dog facing the digital camera 100 is recognized.

In S305, the system control unit 50 controls so that the imaging unit 22 captures a still image of the dog recognized in S304. The system control unit 50 records the captured still image in the memory 32 with attaching the information indicating that the condition is automatic image capturing of a dog.

In S306, the system control unit 50 determines whether a cat facing the digital camera 100 is recognized. The system control unit 50 advances the processing to S307 if a cat facing the digital camera 100 is recognized. The system control unit 50 advances the processing to S308 if no cat facing the digital camera 100 is recognized.

In S307, the system control unit 50 controls so that the imaging unit 22 captures a still image of the cat recognized in S306. The system control unit 50 records the captured still image in the memory 32 with attaching the information indicating that the condition is automatic image capturing of a cat.

In S308, the system control unit 50 determines whether the volume of the sound detected by the sound input unit 65 is a threshold or more. The system control unit 50 advances processing to S309 if the volume of the detected sound is a threshold or more, or to S310 if the volume of the detected sound is less than the threshold.

In S309, the system control unit 50 controls so that the imaging unit 22 captures a still image when the sound detected by the sound input unit 65 becomes a predetermined volume or more in S308. The system control unit 50 records the captured still image in the memory 32 with attaching the information indicating that the condition is automatic image capturing at a predetermined sound volume.

In S310, the system control unit 50 determines whether an instruction to end the automatic image capturing operation is received. The instruction to end the automatic image capturing operation is inputted by the user via the operation unit 70. The instruction to end the automatic image capturing operation is, for example, an operation to change the automatic image capturing mode to another mode using the mode selection switch 60. If the instruction to end the automatic image capturing operation is received, the automatic image capturing operation ends, and processing advances to S311. When the automatic image capturing operation ends, the predetermined image capturing period ends. Processing returns to S302 if the instruction to end the automatic image capturing operation is not received.

When the instruction to end the automatic image capturing operation is received in S310, the system control unit 50 acquires the still image captured by automatic image capturing from the memory 32 in S311. If the still image captured by the automatic image capturing is recorded in the recording medium 200, the system control unit 50 can acquire the still image captured by the automatic image capturing from the recording medium 200. For the acquired still image, the system control unit 50 executes the condition-based classification processing to classify the acquired still image into a group corresponding to the automatic image capturing condition. The system control unit 50 can classify the still image based on the automatic image capturing condition attached to each still image. The condition-based classification processing will be described in detail later with reference to FIG. 4.

In S312, the system control unit 50 displays the still image classified in S311 in a list for each group corresponding to the automatic image capturing condition. Here a group-based list display of still images will be described with reference to FIG. 6.

Figure 6:
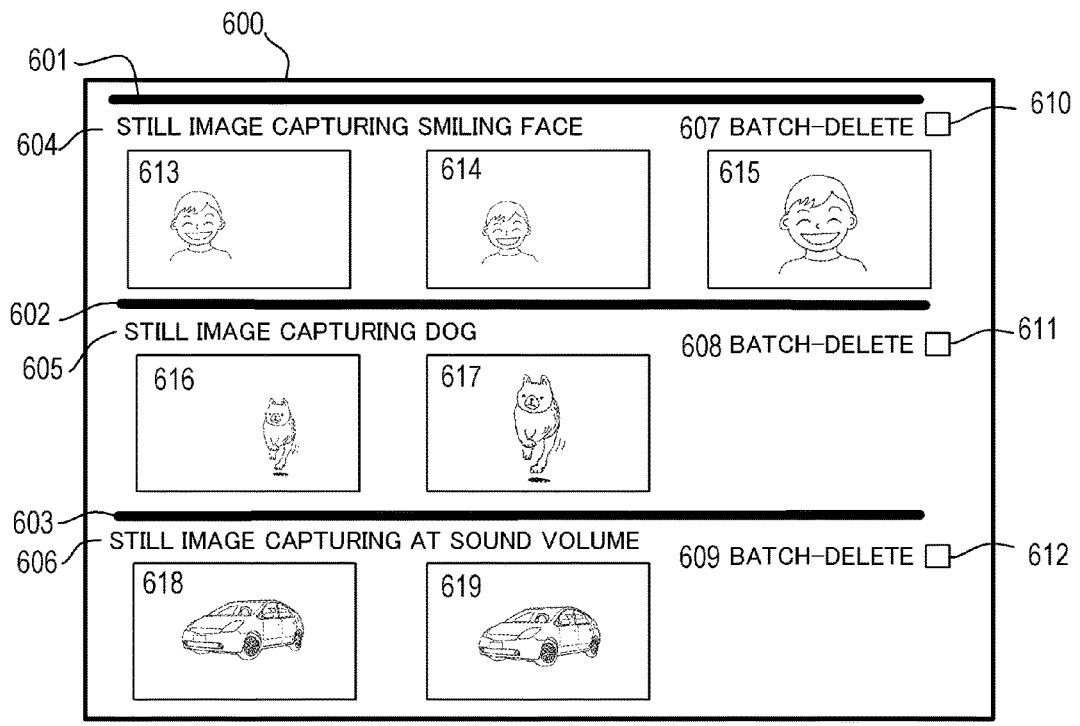
FIG. 6 is an example of a group-based list display screen of automatically captured still images.

FIG. 6 is an example of a group-based list display screen of the automatically captured still images. The system control unit 50 displays a group-based list display screen 600 on the display unit 28a, for example. The group-based list display screen 600 is divided into different groups of still images classified corresponding to the automatic image capturing conditions by a line 601, a line 602 and a line 603. A display field 604, a display field 605 and a display field 606 display the automatic image capturing condition of each group.

A still image 613, a still image 614 and a still image 615 are still images classified into still images capturing a smiling face (still images of which condition is automatic image capturing of a smiling face). A still image 616 and a still image 617 are still images classified into still images capturing a dog (still images of which condition is automatic image capturing of a dog). A still image 618 and a still image 619 are still images classified into still images captured at a predetermined sound volume (still images of which condition is automatic image capturing at a predetermined sound volume).

Display fields 607, 608 and 609 and their respective checkboxes 610, 611 and 612 are setting fields to delete still images in batch as a group. If the check box 610, 611 or 612 of batch-delete is selected, the user can set batch-delete for the still images classified into a corresponding group.

In S313, the system control unit 50 executes save/delete selection processing, to have the user select save or delete of the automatically captured still image. The save/delete selection processing will be described later with reference to FIGS. 5, 6, 7 and 8. When the save/delete selection processing completes, the automatic image capturing processing in FIG. 3 ends.

Condition-Based Classification Processing

Figure 4:
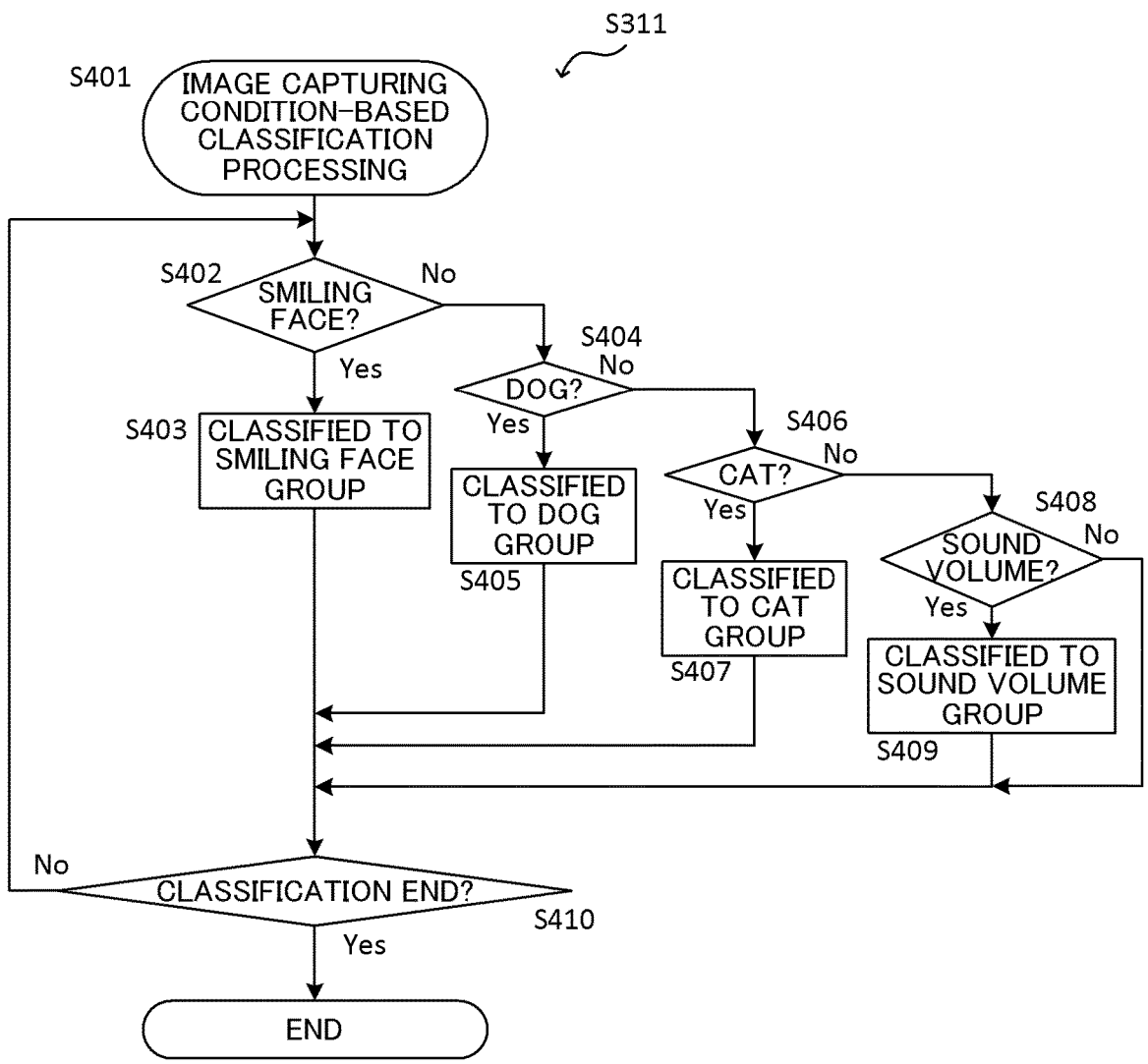
FIG. 4 is a flow chart exemplifying a condition-based classifying processing for a still image.

The condition-based classification processing in S311 in FIG. 3 will be described with reference to FIG. 4. FIG. 4 is a flow chart exemplifying the condition-based classification processing of the automatically captured still image. Each processing in this flow chart is implemented by the system control unit 50 developing the program, which is stored in the non-volatile memory 56, in the system memory 52, and executing the program.

The condition-based classification processing is a processing to classify a plurality of still images, which are captured due to matching with any one of a plurality of conditions in a predetermined image capturing period, into a group corresponding to the condition of automatic image capturing. The predetermined image capturing period is a period when the images are captured in the automatic image capturing mode, for example.

In S401, the system control unit 50 starts the processing to classify the automatically captured still images by a condition of the automatic image capturing.

In S402, the system control unit 50 determines whether the condition of the automatic image capturing attached to the automatically captured still image is the automatic image capturing of an individual with a smiling face. Processing advances to S403 if the condition is the automatic image capturing of an individual with a smiling face, or to S404 if the condition is not the automatic image capturing of an individual with a smiling face. In S403, the system control unit 50 classifies the still image, which was determined that the condition is the automatic image capturing of an individual with a smiling face in S402, into the smiling face group.

In S404, the system control unit 50 determines whether the condition of the automatic image capturing attached to the automatically captured still image is the automatic image capturing of a dog. Processing advances to S405 if the condition is the automatic image capturing of a dig, or to S406 if the condition is not the automatic image capturing of a dog. In S405, the system control unit 50 classifies the still image, which was determined that the condition is the automatic image capturing of a dog in S404, into the dog group.

In S406, the system control unit 50 determines whether the condition of the automatic image capturing attached to the automatically captured still image is the automatic image capturing of a cat. Processing advances to S407 if the condition is the automatic image capturing of a cat, or to S408 if the condition is not the automatic image capturing of a cat. In S407, the system control unit 50 classifies the still image, which was determined that the condition is the automatic image capturing of a cat in S406, into the cat group.

In S408, the system control unit 50 determines whether the condition of the automatic image capturing condition attached to the automatically captured still image is the automatic image capturing at a predetermined sound volume. Processing advances to S409 if the condition is the automatic image capturing at a predetermined sound value, or to S410 if the condition is not the automatic image capturing at a predetermined sound volume. In S409, the system control unit 50 classifies the still image, which was determined that the condition is the automatic image capturing at a predetermined sound volume in S408, into the sound volume group.

In S410, the system control unit 50 determines whether the classification of the still images, which were automatically captured in a predetermined image capturing period, is ended. Processing returns to S402 if the classification of the still images is not ended, or the condition-based classification processing in FIG. 4 ends if the classification of the still images is ended.

Save/Delete Selection Processing

Figure 5:
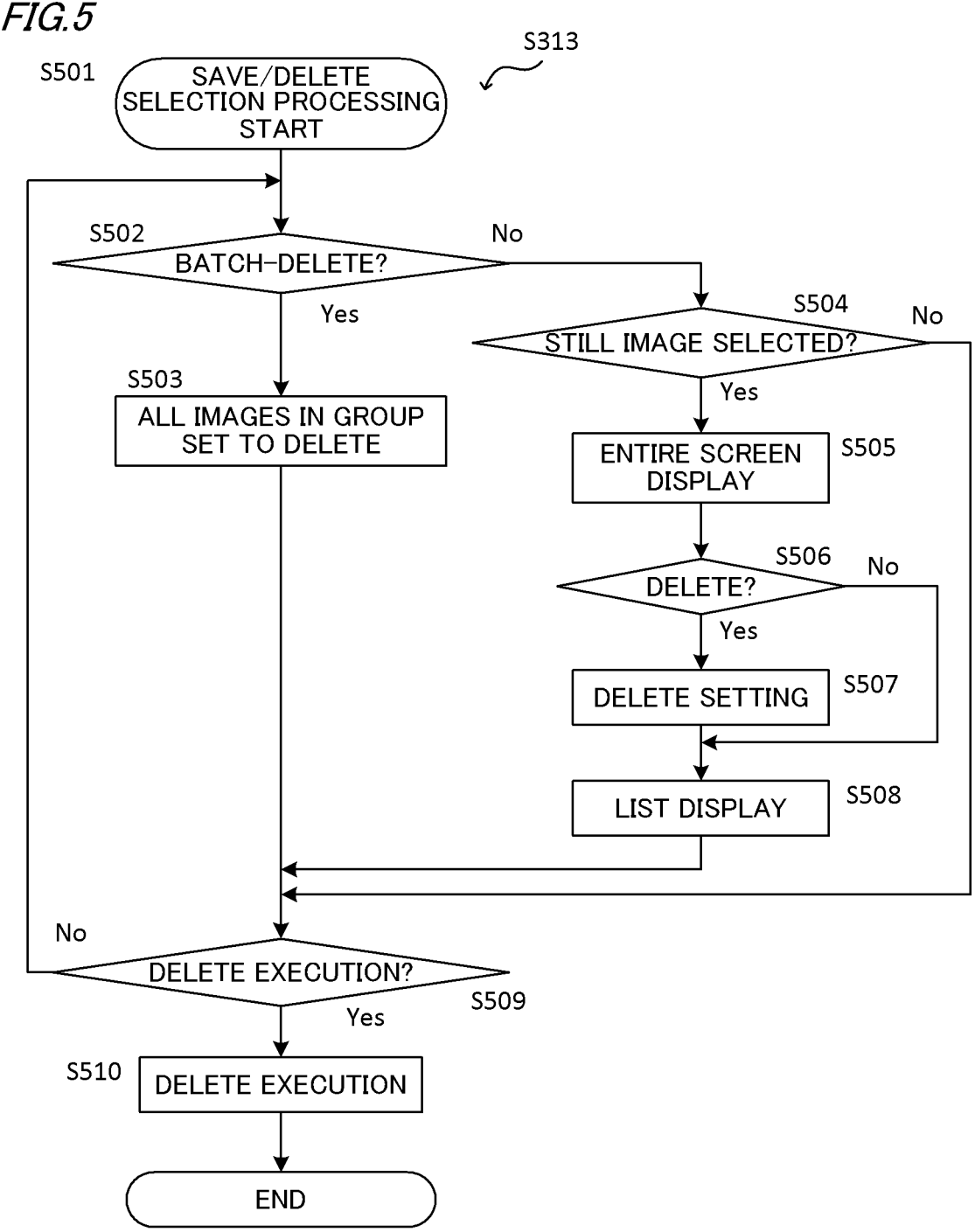
FIG. 5 is a flow chart exemplifying save/delete selection processing for a still image.

The save/delete selection processing in S313 in FIG. 3 will be described in detail with reference to FIG. 5. FIG. 5 is a flow chart exemplifying the save/delete selection processing of an automatically captured still images. The save/delete selection processing is a processing to have the user select still images to be saved or deleted (operation target still images) in the group-based list display screen in FIG. 6, for example. Each processing in this flow chart is implemented by the system control unit 50 developing a program, which is stored in the non-volatile memory 56, in the system memory 52, and executing the program.

In S501, the system control unit 50 starts the save or delete selection processing for an automatically captured still images. Here it is assumed that still images are saved in the recording medium 200, and still images which are not selected as a delete target remain saved.

In S502, the system control unit 50 determines whether the check box 610, 611 or 612 in FIG. 6 is selected to set batch delete. Processing advances to S503 if the batch delete is set, or to S504 if a different operation is performed.

In S503, the system control unit 50 sets delete for still images included in the condition group corresponding to the selected check box. Here a screen example, in the case of setting delete for still images in the group-based list display screen, will be described with reference to FIG. 8.

Figure 8:
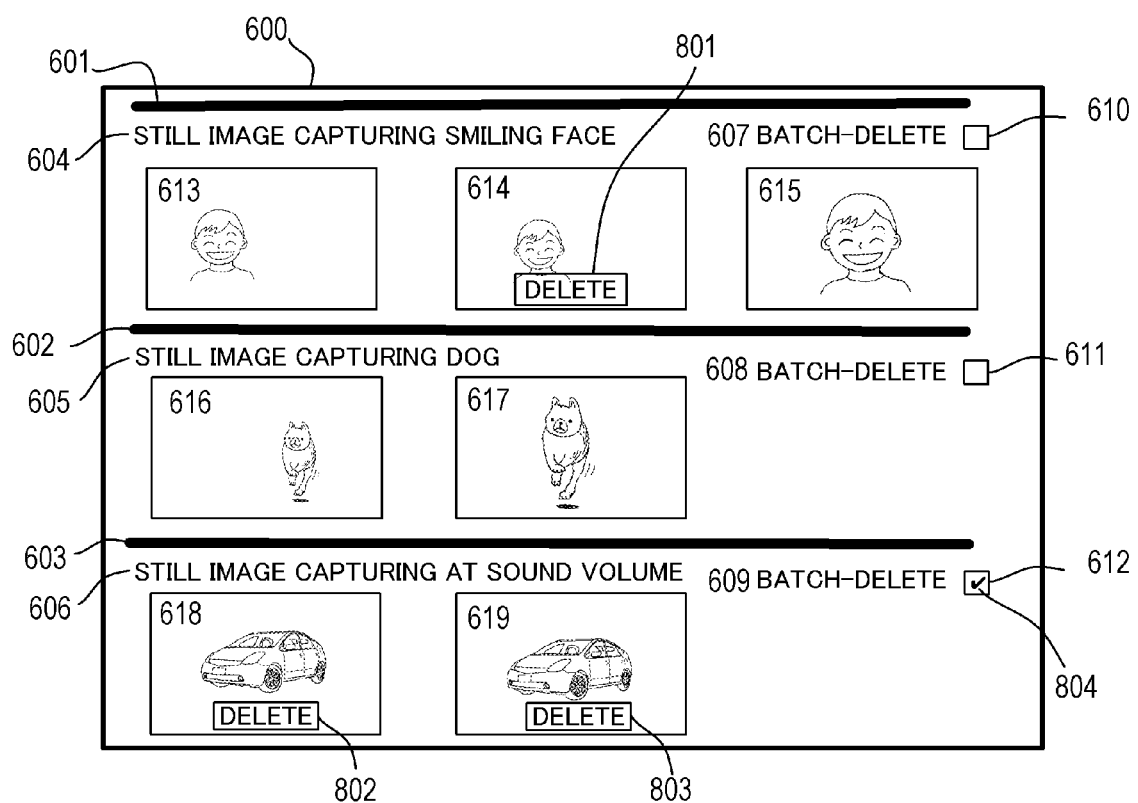
FIG. 8 is an example of the list display screen after delete is set for automatically captured still images.

FIG. 8 is an example of the group-based list display screen after delete is set for automatically captured still images. In the example in FIG. 8, the check mark 804 indicates that the check box 612 is selected. In other words, FIG. 8 indicates that batch-delete is set for a group of still images 606 capturing at a predetermined sound volume. The "Delete" label 802 and the "Delete" label 803 are displayed in the still images 618 and 619 respectively, to clearly indicate that these still images are specified as delete targets.

In S504, the system control unit 50 determines whether the user selected a specific still image. The user can select a desired still image by touching the still image on the display unit 28a. Processing advances to S505 if a specific still image is specified, or to S509 if no still image is selected.

Figure 7:
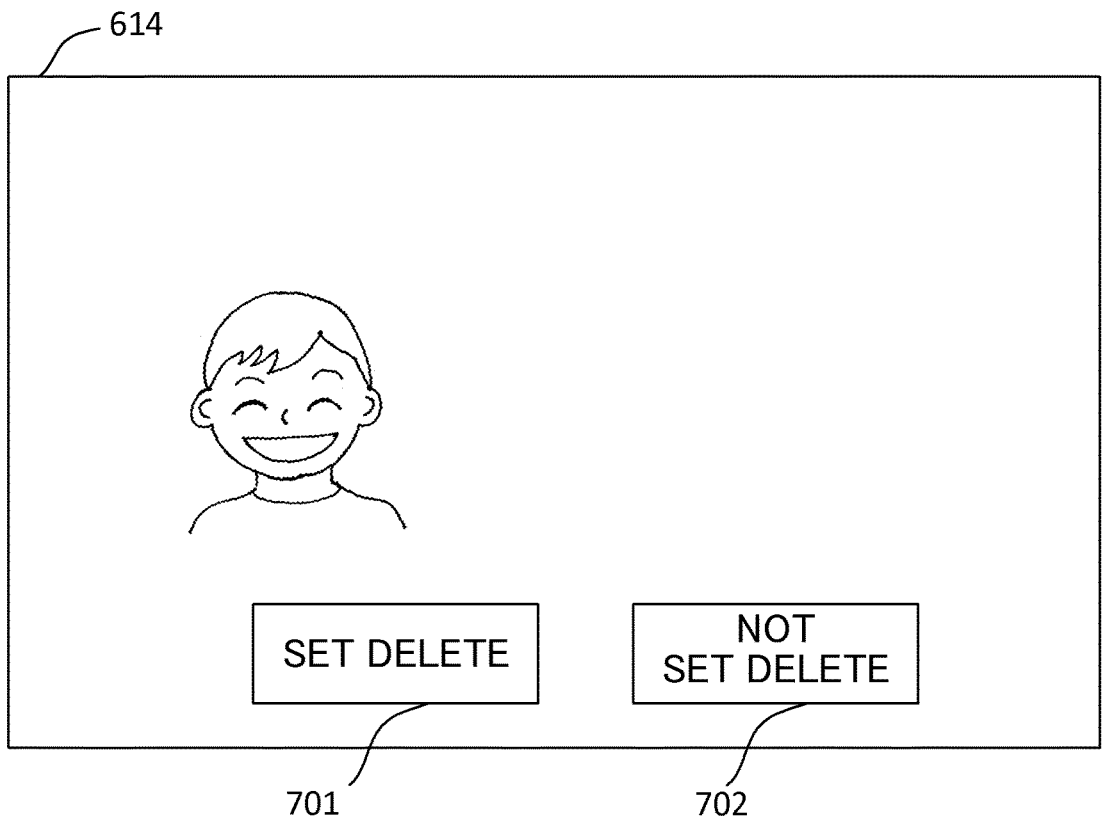
FIG. 7 is an example of a delete setting screen for a still image that is selected in the list display screen.

In S505, the system control unit 50 displays the still image, which is selected in the group-based list display screen in FIG. 6, on the entire screen. For example, a case of selecting the still image 614 in FIG. 6 will be described with reference to FIG. 7. FIG. 7 indicates an example of a delete setting screen for a still image selected in the group-based list display screen. If the still image 614 is selected in the group-based list display screen, for example, the system control unit 50 displays the still image 614 on the display unit 28a. Further, on the delete setting screen, a button icon 701 "Set Delete" and a button icon 702 "Not Set Delete" are displayed.

In S506, the system control unit 50 determines whether delete is set for the still images selected in S504. The system control unit 50 determines that delete is set if the button icon 701 "Set Delete" is pressed in the delete setting screen in FIG. 7. On the other hand, the system control unit 50 determines that delete is not set if the button icon 702 "No Set Delete" is pressed in the delete setting screen in FIG. 7. Processing advances to S507 if delete is set for the selected still image, or to S508 if delete is not set.

In S507, the system control unit 50 sets delete for the still image displayed on the display unit 28a in S505. If the button icon 701 "Set Delete" is pressed in the screen in FIG. 7, delete is set for the still image 614.

In S508, the system control unit 50 displays the group-based list display screen. In this case, as illustrated in FIG. 8, the "Delete" label 801 is displayed in the still image 614 of which delete was set in S507.

In S509, the system control unit 50 determines whether the operation unit 70 performed an operation to instruct execution of delete. The operation to instruct execution of delete is, for example, an operation to press the SET button of the operation unit 70 in the state where the still images to be deleted are selected as indicated in FIG. 8. The system control unit 50 may determine that the operation to instruct the execution of delete is performed when the button icon to instruct the execution of delete is displayed on the screen in FIG. 8, and the user touches the icon. Processing advances to S510 if the operation to instruct the execution of delete is performed, or returns to S502 if the operation to instruct the execution of delete is not performed.

In S510, the system control unit 50 deletes the still images for which delete is set. In the case of FIG. 8, for example, the system control unit 50 deletes the still images 614, 618 and 619. When delete of still images for which delete is set ends, the save/delete selection processing in FIG. 5 ends.

As described above, if automatically captured images can be easily compared based on the condition of automatic image capturing, the user can more easily select a control target still image (e.g. a still image to be saved, a still image to be deleted). As a result, operability for the automatically captured images improves. Further, the user can decrease unnecessary still images, since still images to be deleted can be easily determined.

Modification 1

According to the above embodiment, after image capturing in the automatic image capturing mode ends, the system control unit 50 has the user select still images to be deleted in the group-based list display screen of still images, and deletes the selected still images. The system control unit 50 saves the still images for which the user did not set delete, but the present invention is not limited to this embodiment.

For example, the system control unit 50 may select the still images to be saved in the group-based list display of automatically captured still images, and save the selected still images. In this case, the system control unit 50 deletes the still images for which the user did not set save. Further, the check boxes to set batch-save of the still images for each group may be created, similarly to the check boxes 610, 611 and 612 in FIG. 6, so that the still images in the group are set to be saved in batch.

In the group-based list display of automatically captured still images, save or delete may be set for each still image. Further, save or delete may be set for each group.

In the group-based list display of automatically captured still images, the system control unit 50 may perform various operations, such as changing the attribute of the selected still images in batch.

Modification 2

In the embodiment described above, the predetermined image capturing period where the automatic image capturing is performed is a period where the automatic image capturing mode is set, but the present invention is not limited to this. For example, the predetermined image capturing period may be a period of capturing a moving image, and automatic image capturing may be performed during capturing the moving image. Further, the predetermined image capturing period may be a period from a specific automatic image capturing start time, which the user sets, until a predetermined time elapses, or until the user performs an operation to instruct the end of automatic image capturing. Further, the predetermined image capturing period may be started at a timing when a predetermined operation (e.g. wink of the subject individual) is detected in the automatic image capturing mode.

Modification 3

In the embodiment described above, a case where a number of imaging units 22 is one was described, but the present invention is not limited to this. The digital camera 100 may include two imaging units 22, for example. In this case, while one imaging unit 22 is capturing a moving image, the other imaging unit 22 can perform automatic image capturing. When the image capturing of the moving image ends, the digital camera 100 can display the group-based list in which automatically captured still images are classified by condition.

Modification 4

In the embodiment described above, the system control unit 50 displays a group-based list, in which automatically captured still images are classified by condition of automatic image capturing, but the timing of displaying the list is not limited to this.

For example, at the timing when the user deletes still images, the system control unit 50 may display a list of the delete target still images, and other still images which were automatically captured under the same condition during the same automatic image capturing period (predetermined image capturing period), and have the user select whether each still image is deleted or not. The user can set save or delete for the still images which were automatically captured under the same conditions as the delete target still images during the same image capturing period, and delete unnecessary still images.

The system control unit 50 may classify the delete target still images and other still images captured during the same automatic image capturing period by condition of automatic image capturing, display the list thereof, and have the user select still images to be deleted or still images to be saved.

In the case where the predetermined image capturing period is the period during capturing a moving image, and automatic image capturing is performed during capturing the moving image, the system control unit 50 may classify the still images captured during the moving image capturing period by condition of automatic capturing, and at a timing of deleting the moving image. Then the user can set save or delete for the still images which were automatically captured during the moving image capturing period, whereby unnecessary still images can be deleted.

Modification 5

In the embodiment described above, the automatically captured still images are classified into each condition-based group, and the still images displayed in a list for each group are saved or deleted, but the setting for each still image is not limited to save or delete. The system control unit 50 may receive input of evaluation of a still image to be saved from the user on the group-based list display screen of automatically captured still images. In this case, the inputted evaluation information from the user is attached to the still image and saved along with the still image.

Modification 6

In the embodiment described above, the automatically captured still images, which are classified by condition of automatic image capturing and displayed as a list, are saved in the memory 32 or the recording medium 200, but the present invention is not limited to this. For example, the digital camera 100 may be connected to a wireless local area network (LAN) or Internet via the communication unit 54, so that the automatically captured still images can be sent to and saved in an external apparatus.

Modification 7

In the embodiment described above, the automatically captured still images are classified into groups corresponding to the conditions of automatic image capturing, and are displayed as a list by group. In Modification 7, the user can rearrange the still images so that the still images can be more easily compared. For example, in the group-based list display screen in FIG. 6, the still images are displayed by condition of automatic image capturing (for each group), delimited by the lines 601, 602 and 603. Within each delimited group, a still image for comparison may be touched and moved next to a target still image by dragging.

Other Embodiments

Various controls described above are performed by the system control unit 50, but may be performed by one hardware component or by a plurality of hardware components (e.g. plurality of processors and circuits) which share processing operations to control the entire apparatus.

While the present invention has been described with reference to the preferred embodiments, the present invention is not limited to these specific embodiments, but includes various modes within the scope that does not depart from the essence of the invention. Each of the abovementioned embodiments is merely an example of the invention, and may be combined as required.

In the embodiments described above, the present invention is applied to the digital camera 100, but the present invention is not limited to this example, and is applicable to any electronic apparatus that includes the function to display images which are automatically compared in accordance with the condition of automatic image capturing. In other words, the present invention is applicable, for example, to a personal computer, PDA, portable telephone terminal, portable image viewer, printer, digital photo frame, music player, game machine, electronic book reader and the like that include a display.

The present invention is applicable not only to an electronic apparatus main unit, but also to a control device which communicates with the electronic apparatus (including a network camera) wirelessly or via cable, and remotely controls the electronic apparatus. Examples of the device that remotely controls the electronic apparatus are a smartphone, tablet PC and desktop PC. The electronic apparatus can be remotely controlled by notifying commands to perform various operations and setting s from the control device side to the electronic apparatus based on the operation or processing performed by the control device. A live view image captured by the electronic apparatus may be received by the control device wirelessly or via cable, and displayed at the control device side.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can make it easier for the user to select an operation target among the images which are automatically captured on any one of a plurality of conditions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-184647, filed on Oct. 7, 2019, which is hereby incorporated by reference herein in its entirety.

What is claimed is:

1. An electronic apparatus comprising at least memory and at least one processor which function as:
   an acquisition unit configured to acquire an image captured on any one of a plurality of conditions in a predetermined period;
   a display control unit configured to implement control so that a plurality of images acquired by the acquisition unit are classified into groups correspondingly to the plurality of conditions and displayed; and
   a selection unit configured to implement control so that an operation target image is selected in accordance with user operation from the plurality of images that are classified and displayed by the display control unit,
   wherein in a case where the acquisition unit acquires a still image captured on any one of the plurality of conditions during capturing of a moving image in the predetermined period and in a case where the moving image is deleted, the display control unit implements control so that a plurality of still images, captured on any one of the plurality of conditions during capturing of the moving image, are classified into groups correspondingly to the plurality of conditions and displayed, and
   the selection unit implements control so that a still image to be deleted or a still image to be saved is selected in accordance with user operation from the plurality of displayed still images.

2. The electronic apparatus according to claim 1, wherein the selection unit implements control so that an image to be deleted or an image to be saved is selected in accordance with user operation.

3. The electronic apparatus according to claim 1, wherein the display control unit implements control so that the acquired image is displayed after the predetermined period.

4. The electronic apparatus according to claim 1, wherein in a case where the plurality of images acquired by the acquisition unit are classified and displayed, the display control unit implements control so that information relating to a condition corresponding to each of the groups is displayed.

5. The electronic apparatus according to claim 1, wherein the selection unit implements control so that images belonging to at least one group, out of the plurality of groups corresponding to the plurality of conditions, are selected, en bloc, as operation targets.

6. The electronic apparatus according to claim 1, further comprising an evaluation unit configured, in a case where the image acquired by the acquisition unit has been selected as an image to be saved, to attach evaluation information, which is inputted by a user, to the image selected as the image to be saved.

7. The electronic apparatus according to claim 1, wherein in a case where the images acquired by the acquisition unit are classified into groups correspondingly to the plurality of conditions and displayed, the display control unit implements control so that the images in the group are rearranged and displayed in accordance with user operation.

8. The electronic apparatus according to claim 1, further comprising a transmission unit configured to transmit to an external apparatus an image selected by the selection unit as an image to be saved.

9. The electronic apparatus according to claim 1, wherein in a case where a saved image is deleted, the selection unit implements control so that an image to be deleted or an image to be saved is selected from images, the image capturing periods of which or the automatic image capturing conditions of which are identical to that of the saved image.

10. The electronic apparatus according to claim 1, wherein the image captured on any one of the plurality of conditions in the predetermined period is a still image or a moving image.

11. The electronic apparatus according to claim 1, further comprising at least one imaging unit,
wherein the acquisition unit is configured to acquire an image captured by the at least one imaging unit on any one of the plurality of conditions in the predetermined period.

12. A control method for an electronic apparatus, the method comprising:
an acquisition step of acquiring an image captured on any one of a plurality of conditions in a predetermined period;
a display control step of implementing control so that a plurality of images acquired in the acquisition step are classified into groups correspondingly to the plurality of conditions and displayed; and
a selection step of implementing control so that an operation target image is selected in accordance with user operation from the plurality of images that are classified and displayed in the display control step,
wherein in a case where the acquisition step acquires a still image captured on any one of the plurality of conditions during capturing of a moving image in the predetermined period and in a case where the moving image is deleted, the display control step implements control so that a plurality of still images, captured on any one of the plurality of conditions during capturing of the moving image, are classified into groups correspondingly to the plurality of conditions and displayed, and
the selection step implements control so that a still image to be deleted or a still image to be saved is selected in accordance with user operation from the plurality of displayed still images.

13. A non-transitory computer readable medium that stores a program, wherein the program causes a computer to execute:
an acquisition step of acquiring an image captured on any one of a plurality of conditions in a predetermined period;
a display control step of implementing control so that the plurality of images acquired in the acquisition step are classified into groups correspondingly to the plurality of conditions and displayed; and
a selection step of implementing control so that an operation target image is selected in accordance with user operation from the plurality of images that are classified and displayed in the display control step,
wherein in a case where the acquisition step acquires a still image captured on any one of the plurality of conditions during capturing of a moving image in the predetermined period and in a case where the moving image is deleted, the display control step implements control so that a plurality of still images, captured on any one of the plurality of conditions during capturing of the moving image, are classified into groups correspondingly to the plurality of conditions and displayed, and
the selection step implements control so that a still image to be deleted or a still image to be saved is selected in accordance with user operation from the plurality of displayed still images.

* * * * *